United States Patent
Stabler et al.

(10) Patent No.: US 10,625,213 B2
(45) Date of Patent: Apr. 21, 2020

(54) PRODUCTION SYSTEM FOR COMPOSITE POROUS SOLID ARTICLES

(71) Applicant: Arkema Inc., King of Prussia, PA (US)

(72) Inventors: Sean M. Stabler, Pottstown, PA (US); Evan E. Koslow, Dallas, TX (US)

(73) Assignee: ARKEMA INC., King of Prussia, PA (US)

( * ) Notice: Subject to any disclaimer, the term of this patent is extended or adjusted under 35 U.S.C. 154(b) by 30 days.

(21) Appl. No.: 15/567,173

(22) PCT Filed: Apr. 12, 2016

(86) PCT No.: PCT/US2016/027022
§ 371 (c)(1),
(2) Date: Oct. 17, 2017

(87) PCT Pub. No.: WO2016/168140
PCT Pub. Date: Oct. 20, 2016

(65) Prior Publication Data
US 2018/0104654 A1    Apr. 19, 2018

Related U.S. Application Data

(60) Provisional application No. 62/148,770, filed on Apr. 17, 2015.

(51) Int. Cl.
*B01D 67/00* (2006.01)
*B01J 20/28* (2006.01)
(Continued)

(52) U.S. Cl.
CPC ......... *B01D 67/0041* (2013.01); *B01D 69/04* (2013.01); *B01D 69/06* (2013.01);
(Continued)

(58) Field of Classification Search
CPC .. B01D 67/0041; B01D 69/12; B01D 71/021; B01D 69/148; B01D 69/08; B01D 69/06;
(Continued)

(56) References Cited

U.S. PATENT DOCUMENTS 8,690,981 B2 * 4/2014 Mao ................... B01D 39/1661
264/126
9,239,051 B1 * 1/2016 Amin-Sanayei ....... H01G 11/30
(Continued)

FOREIGN PATENT DOCUMENTS

| WO | WO-2010120977 A1 * | 10/2010 | ......... B01D 39/1661 |
| WO | WO-2014055473 A2 * | 4/2014 | .......... B01D 39/163 |
| WO | WO-2014182861 A1 * | 11/2014 | ......... B01D 39/2062 |

OTHER PUBLICATIONS

Kynar Flex PFDV Performance Characteristics and Data Brochure (Year: 2013).*

*Primary Examiner* — Pamela H Weiss
(74) *Attorney, Agent, or Firm* — Joanne Rossi

(57) ABSTRACT

A production system for manufacturing composite porous solid articles is provided wherein the color of such articles is monitored to confirm that the articles, which are produced by heating and compressing mixtures of poly(vinylidene fluoride) binder powder (such as Kyblock® resin from Arkema) and activated carbon powder, are fully cured. Adjustments to the processing conditions are made when a region of the article appears blue (indicative of incomplete curing).

14 Claims, 2 Drawing Sheets

(51) Int. Cl.
| | |
|---|---|
| *B01J 20/18* | (2006.01) |
| *B01J 20/30* | (2006.01) |
| *B01J 20/14* | (2006.01) |
| *B01J 20/08* | (2006.01) |
| *B01J 20/10* | (2006.01) |
| *B01D 69/14* | (2006.01) |
| *B01D 69/12* | (2006.01) |
| *B01D 71/34* | (2006.01) |
| *C02F 1/44* | (2006.01) |
| *C02F 1/28* | (2006.01) |
| *B01D 69/04* | (2006.01) |
| *B01D 69/06* | (2006.01) |
| *B01D 69/08* | (2006.01) |
| *B01D 71/02* | (2006.01) |
| *B01J 20/20* | (2006.01) |
| *B01J 47/018* | (2017.01) |
| *B01J 20/26* | (2006.01) |
| *B01D 61/14* | (2006.01) |

(52) U.S. Cl.
CPC ............ *B01D 69/08* (2013.01); *B01D 69/12* (2013.01); *B01D 69/148* (2013.01); *B01D 71/021* (2013.01); *B01J 20/08* (2013.01); *B01J 20/103* (2013.01); *B01J 20/14* (2013.01); *B01J 20/18* (2013.01); *B01J 20/20* (2013.01); *B01J 20/205* (2013.01); *B01J 20/261* (2013.01); *B01J 20/2803* (2013.01); *B01J 20/28004* (2013.01); *B01J 20/28021* (2013.01); *B01J 20/28033* (2013.01); *B01J 20/28042* (2013.01); *B01J 20/3007* (2013.01); *B01J 20/3035* (2013.01); *B01J 20/3078* (2013.01); *B01J 47/018* (2017.01); *C02F 1/283* (2013.01); *C02F 1/44* (2013.01); *B01D 61/14* (2013.01); *B01D 71/34* (2013.01); *B01D 2323/08* (2013.01); *B01D 2323/10* (2013.01); *B01D 2323/42* (2013.01)

(58) Field of Classification Search
CPC .......... B01D 69/04; B01D 2323/42; B01D 2323/10; B01D 2323/08; B01D 61/14; B01D 71/34; B01J 20/3078; B01J 20/261; B01J 20/28004; B01J 20/28033; B01J 20/3035; B01J 47/018; B01J 20/205; B01J 20/103; B01J 20/28042; B01J 20/3007; B01J 20/2803; B01J 20/20; B01J 20/18; B01J 20/14; B01J 20/08; B01J 20/28021; C02F 1/283; C02F 1/44

See application file for complete search history.

(56) References Cited

U.S. PATENT DOCUMENTS

| | | | |
|---|---|---|---|
| 2005/0155216 A1* | 7/2005 | Cho ................ | B82Y 30/00 29/623.5 |
| 2010/0104845 A1* | 4/2010 | MacLennan ....... | B01D 67/0004 428/221 |
| 2010/0304270 A1* | 12/2010 | Amin-Sanayei .... | H01M 4/0404 429/483 |
| 2012/0318139 A1* | 12/2012 | Mao ................ | B01D 39/1661 95/116 |
| 2013/0330611 A1* | 12/2013 | Chen ................ | B82Y 30/00 429/211 |
| 2015/0231576 A1 | 8/2015 | Stabler et al. | |
| 2016/0121249 A1* | 5/2016 | Koslow ............. | B01D 39/2062 210/502.1 |
| 2018/0047986 A1* | 2/2018 | Stabler ............. | H01M 4/131 |

* cited by examiner

Kyblock® Binder (white)

Activated Carbon (Black)

Kyblock® binder mixed with Activated Carbon (Blue)

PRODUCTION SYSTEM FOR COMPOSITE POROUS SOLID ARTICLES

This application claims benefit, under U.S.C. § 119 or § 365 of PCT Application Number PCT/US2016/027022, filed Apr. 12, 2016; and U.S. Provisional Application No. 62/148,770, filed Apr. 17, 2017; said applications incorporated herein by reference.

FIELD OF THE INVENTION

The present invention relates to quality improvement and control systems for producing composite porous solid articles, such as carbon blocks and separation articles, from mixtures of poly(vinylidene fluoride) (PVDF) binder powder, activated carbon powder, and other potential processing additives.

BACKGROUND OF THE RELATED ART

Composite porous solid articles such as porous separation articles and carbon blocks are known in the art, wherein such articles are produced using mixtures of thermoplastic binders and interactive powdery or fibrous materials such as activated carbon powder. The articles generally are formed under conditions effective to permit the thermoplastic binder to connect the interactive powdery or fibrous materials in discrete spots, rather than as a complete coating. This arrangement permits the interactive powdery or fibrous materials to be in direct contact with, and to interact with, a fluid or gas. The resulting composite porous solid article is porous, thereby permitting the fluid or gas to penetrate into and even pass through the article. Such articles are useful in water purification, as well as in the separation of dissolved or suspended materials in both aqueous and non-aqueous systems in industrial uses. Examples of such composite porous solid articles, as well as methods for producing them, are described for example in WO 2014/055473 and WO 2014/182861, the entire disclosures of each of which are incorporated herein by reference for all purposes.

When producing such composite porous solid articles, it is important to ensure that the article is fully "cured" so that essentially all of the interactive powdery or fibrous material is bound securely into the article by the thermoplastic binder. The thermoplastic binder is heated to a temperature where the thermoplastic binder softens sufficiently that, upon cooling, the components of the mixture are fused together into a porous unitary body. Achieving full "curing" of the article will minimize the possibility that some portion of the interactive powdery or fibrous material remains capable of being dislodged from the composite porous solid article when the article is subjected to routine handling or normal use. For example, if the article is to be used for water purification, passing a volume of water through the article will not wash out any particles of the interactive powdery or fibrous material if the article has been fully cured. As another example, full curing will help improve the mechanical integrity of the article, thereby reducing the propensity of particles of the interactive powdery or fibrous material to separate from a surface of the article as the article is being manipulated (e.g., during the manual replacement of a carbon block in a filtration apparatus). While a greater degree of curing may generally be achieved by increasing the temperature at which a mixture of thermoplastic binder and interactive powdery or fibrous material is being formed into a composite porous solid article, excessive temperatures or heating conditions may cause an undesirable loss in the porosity of the article or in the ability of the powdery or fibrous material to interact with a fluid. Accordingly, establishing an optimum set of processing conditions for forming such a mixture into a composite porous solid article has proven to be challenging.

SUMMARY OF THE INVENTION

It has now been unexpectedly discovered that when a mixture of a poly(vinylidene fluoride) binder powder and activated carbon powder is heated and optionally compressed to form a composite porous solid article, any incompletely cured region of such article will be blue in appearance. In contrast, fully cured regions will appear black. That is, a black color is indicative of full cure and a blue color is indicative of incomplete cure. Thus, monitoring the color of articles being produced has been found to be a reliable and convenient way of determining whether the processing conditions being used are effective to achieve full curing of the mixture. If any portion(s) of the articles is/are blue in color, then the processing conditions may be adjusted as necessary (for example, by increasing the temperature at which the mixture is heated) until the articles become completely black.

This color change is unique to articles made with polyvinylidene fluoride binder, and is not found in carbon block articles made with binders currently used. Since there is no color change in a carbon block article made with typical binders—such as polyolefins—there is no real-time visual inspection indicator of complete curing of the block article. The current invention solves this problem by providing a color change indicator of full curing with a PVDF binder in the manufacture of a carbon block article.

According to aspects of the invention, "black" means a color satisfying the following Hunter values, as measured by ASTM D 2244:

Hunter L value: $\leq 25$, preferably $\leq 22$, more preferably $\leq 20$, most preferably $\leq 18$;

Hunter a value: $>0$, preferably $>0.5$, more preferably $>1$;

Hunter b value: $>0$, preferably $>0.5$, more preferably $>1$.

According to aspects of the invention, "blue" means a color satisfying the following Hunter values, as measured by ASTM D 2244:

Hunter L value: $>18$, preferably $>20$, more preferably $>25$, most preferably $>30$;

Hunter a value: $<0$, preferably $<-0.5$, more preferably $<-1$;

Hunter b value: $<-0.5$, preferably $<-5$, more preferably $<-8$.

The present invention thus can be used to facilitate the start-up of a production line for producing composite porous solid articles, wherein the effectiveness of the initially selected processing conditions in providing fully cured articles of high quality may be readily verified. If such initially selected processing conditions are found to be unsatisfactory, adjustments to such conditions may be made until fully cured articles are produced, as confirmed by an inspection of the color of such subsequently produced articles. Additionally, the present invention is also useful for maintaining quality control of such a production line, to assure that the articles being produced continue to be fully cured.

Thus, one aspect of the invention provides a production system for making composite porous solid articles, wherein the production system comprises the steps of:

a) heating and optionally compressing a first portion of a mixture of a poly(vinylidene fluoride) binder powder and activated carbon powder under a first set of processing conditions to form a first composite porous solid article;

b) inspecting the first composite porous solid article to determine if the first composite porous solid article is completely black in color; and c-1) if the first composite porous solid article is completely black in color, heating and compressing a second portion of the mixture under the first set of processing conditions to form a second composite porous solid article; or c-2) if the first composite porous solid article is not completely black in color, selecting a second set of processing conditions different from the first set of processing conditions and heating and forming a second portion of the mixture under the second set of processing conditions to form a second composite porous solid article.

In one embodiment of such production system, the heating and optionally compressing of the first portion and the second portion of the mixture is performed by compression molding the mixture. In another embodiment, the heating and compressing of the first portion and the second portion of the mixture is performed by extruding the mixture. The heating and compressing may be carried out simultaneously, but may also be carried out sequentially (for example, the mixture may be heated in the absence of any compression and then subjected to compression, typically together with further heating). In another embodiment, no added compression is applied.

In one variation of the production system, step c-2) is performed and the second set of processing conditions differs from the first set of processing conditions in that heating and compressing the second portion of the mixture is performed at a higher temperature. The first composite porous solid article and the second composite porous solid article may each be in the form of a solid or hollow cylinder. Alternatively, they may be in the form of a sheet.

The poly(vinylidene fluoride) binder powder may have an average particle size of less than 20 micrometers and may comprise between about 3 and about 30 percent by weight, preferably between 5 and 25 percent by weight, more preferably between 7 and 20 percent by weight, most preferably between 9 and 15 percent by weight of the first composite porous solid article and the second composite porous solid article.

According to one embodiment of the invention, step c-2) is performed and the production system comprises additional steps of inspecting the second composite porous solid article to determine if the second composite porous solid article is completely black in color and, if the second composite porous solid article is completely black in color, heating and compressing a third portion of the mixture under the second set of processing conditions to form a third composite porous solid article, or, if the second composite porous solid article is not completely black in color (e.g., exhibits at least one region which is blue in color), selecting a third set of processing conditions different from the first set and second set of processing conditions and heating and forming a third portion of the mixture under the third set of processing conditions to form a third composite porous solid article. Further iterations of these steps may be performed until composite porous solid articles are obtained which are completely black in color.

In one aspect of the invention, the first composite porous article exhibits at least one region which is blue in color. If such a blue-colored region is observed, the processing conditions used to manufacture the first composite porous article are varied when subsequent composite porous articles are made until composite porous articles which are completely black in color are obtained. The processing conditions (temperature, pressure) found to produce completely black composite porous articles are then maintained for the continued production of additional composite porous articles.

In other aspects of the invention, the mixture of poly (vinylidene fluoride) binder powder and activated carbon powder is blue in color prior to being exposed to heat and compression. Upon being heated and compressed, the mixture is converted to a solid (but porous), self-standing fully cured black structure.

A set of composite porous solid articles is further provided by the present invention. The set is comprised of a first composite porous solid article and a second composite porous solid article, wherein the first composite porous solid article and the second composite porous solid article are compositionally the same and are comprised of a poly (vinylidene fluoride) binder and activated carbon, the first composite solid article contains at least one region which is blue in color and is an unfinished article, and the second composite solid article is completely black in color and is a finished article. In the context of the present invention, a finished article is an article that is ready to be used for its intended purpose (e.g., in water purification or the separation of dissolved or suspended materials in aqueous and/or non-aqueous systems) while an unfinished article is an article that requires additional heating and/or compressing or other processing in order to be suitable for such use.

DETAILED DESCRIPTION OF CERTAIN EMBODIMENTS OF THE INVENTION

Poly(Vinylidene Fluoride) Binder Powder

Figure 1:
FIG. 1: shows Kyblock® PVDF powder (white).

The binder which is used in the preparation of composite porous solid articles in accordance with the present invention comprises a poly(vinylidene fluoride). The term poly (vinylidene fluoride), as used herein, denotes any polymer that has in its chain at least one monomer which is vinylidene fluoride (sometimes also referred to as vinylidene fluoride or VDF). The vinylidene fluoride may be homopolymerized or copolymerized with one or more other fluoromonomers, examples of which include, but are not limited to vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl vinyl)

ethers, such as perfluoro(methyl vinyl) ether (PMVE), perfluoro(ethyl vinyl) ether (PEVE) and perfluoro(propyl vinyl) ether (PPVE); perfluoro(1,3-dioxole); and perfluoro(2,2-dimethyl-1,3-dioxole) (PDD).

The binder may be a blend of a PVDF homopolymer or copolymer with one or more other polymers that are compatible with the PVDF (co)polymer. For example, the binder may be a blend of a poly(vinylidene fluoride) and a (meth) acrylate homopolymer or copolymer (e.g., the binder may be a blend of from 5 to 49 weight percent polymethylmethacrylate polymer or copolymer and 51 to 95 weight percent poly(vinylidene fluoride).

Exemplary PVDF copolymers and terpolymers useful in the invention include those in which vinylidene fluoride units comprise greater than 40 percent of the total weight of all the monomer units in the polymer, and more preferably, comprise greater than 70 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene.

In one embodiment, up to 30%, preferably up to 25%, and more preferably up to 15% by weight of hexafluoropropene (HFP) units and 70%, preferably 75%, more preferably 85% by weight or more of VDF units are present in the poly(vinylidene fluoride).

In one aspect of the invention, the poly(vinylidene fluoride) used in the invention has a high molecular weight. By high molecular weight, as used herein, is meant poly(vinylidene fluoride) having a melt viscosity of greater than 1.0 kilopoise, preferably greater than 5 Kp, more preferably from 15 to 50 Kp, and most preferably from 15 to 25 Kp, according to ASTM method D-3835 measured at 450° F. (232° C.) and 100 sec$^{-1}$. The high molecular weight poly(vinylidene fluoride) provides for interconnectivity, as it has a higher viscosity and lower flow, so it does not entirely coat the activated carbon particles.

"Interconnectivity", as used herein means that the particles of activated carbon are permanently bonded together by the binder without completely coating the activated carbon particles. The binder adheres the activated carbon particles together at specific discrete points to produce an organized, porous structure. The porous structure allows a fluid to pass through the interconnected particles, and the fluid composition is exposed directly to the surface(s) of the activated carbon, favoring the interaction of the particles with components of the fluid composition, resulting in separation of the components of the fluid. Since the poly(vinylidene fluoride) binder adheres to the activated carbon particles in only discrete points, less binder is used for full connectivity than in a coating.

In some embodiments, the poly(vinylidene fluoride) binder powder used in the preparation of the composite porous solid articles has an average particle size of less than 20 micrometers, less than 15 micrometers, less than 12 micrometers, less than 10 micrometers, or even approximately 5 micrometers (or less). Average particle size is measured on a polymer suspension using a Mastersizer® 3000 (from Malvern) laser particle size analyzer.

The poly(vinylidene fluoride) used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride and optionally other monomer(s) is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of monomer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the PVDF emulsion is fluorosurfactant free, with no flurosurfactants being used in any part of the polymerization. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The polymerization results in a latex generally having a solids level of 10 to 60 percent by weight, preferably 10 to 50 percent, and having a latex weight average particle size of less than 500 nm, preferably less than 400 nm, and more preferably less than 300 nm. The weight average particle size is generally at least 20 nm and preferably at least 50 nm. A minor amount of one or more other water-miscible solvents, such as ethylene glycol, may be mixed into the latex to improve freeze-thaw stability.

The PVDF latex may be dried to a powder by means known in the art, such as, but not limited to, spray drying, freeze-drying, coagulating, and drum drying. The dried PVDF powder may have an average particle size of from 0.5 to 200 microns, preferably from 1 to 100 microns, more preferably from 2 to 50 microns, and most preferably from 3 to 20 microns. Smaller size particles are preferred, as they result in a decreased distance (higher density) of activated carbon particles. In an extrusion process, the polymer resin particles soften in the non-crystalline regions to adhere to the particles at discrete points, but do not melt to completely cover the particles. The poly(vinylidene fluoride) binder may also be utilized in latex form, without an initial drying step, to prepare the mixture with activated carbon powder.

Especially useful poly(vinylidene fluoride) resins include, but are not limited to, homopolymer and copolymer Kyblock® resins from Arkema Inc., especially Kyblock® PVDF resins with particle sizes ranging from 3-20 microns and melt viscosities between 4-55 kpoise. The melt viscosities are measured by ASTM D3835 at 232° C. and 100 s$^{-1}$.

In one embodiment, copolymers of VDF and HFP are used to prepare the poly(vinylidene fluoride) binder powder. These copolymers have a lower surface energy. It is noted that PVDF in general has a lower surface energy than other polymers such as polyolefins. Lower surface energy leads to better wetting of the activated carbon particles, and a more uniform dispersion. This results in an improvement in the integrity of the composite porous solid article as compared to a polymer binder with a higher surface energy, and should result in the need for a lower level of binder. Additionally, PVDF/HFP copolymers have a lower crystallinity and a lower glass transition temperature (Tg), and therefore can be processed at a lower temperature in a melt process.

In one variant of the invention, the poly(vinylidene fluoride) is a functional PVDF, such as maleic anhydride-grafted PVDF from Arkema. The functional PVDF would improve the binding to activated carbon particles, which could permit a lower level of PVDF loading in the formulation. This lower loading-excellent binding combination would improve the overall permeability of the composite porous solid article.

The mixture used to form composite porous solid articles in accordance with the present invention may contain one or more types of polymer other than poly(vinylidene fluoride). However, in one embodiment, the mixture does not contain any type of polymer other than polymer(s) containing vinylidene fluoride as a monomer.

Activated Carbon Powder

Activated carbon (sometimes also referred to as active carbon or activated charcoal) is generally produced from carbonaceous source materials such as, for example, nutshells, bamboo, bone, coconut shell, wood, or coal. Activated carbon can be produced by carbonization in combination with activation/oxidation. During carbonization, raw carboniferous material typically is pyrolyzed at a temperature in the range 600-900° C. in absence of air (for example, in a nitrogen or argon atmosphere). In an activation/oxidation step, the raw carboniferous material or carbonized material is exposed to oxidizing atmospheres (for example, carbon dioxide, oxygen, or steam) at temperatures above 250° C., usually in the temperature range of 600-1200° C. In some cases, impregnation or treatment with chemicals such as acids (for example, phosphoric acid) or bases (for example, potassium hydroxide), or metal salts (for example, zinc chloride) is practiced, followed by carbonization at temperatures in the range of 450-900° C.

Activated carbon generally binds materials by adsorption. Once prepared, the activated carbon can be comminuted to the desired particle size distribution by any suitable technique (for example, by crushing and/or milling), typically followed by classifying the resultant powder (for example, by air classifying or sieving) to obtain a particular particle size distribution. For example, the particle size (diameter) of the activated carbon may be from 0.1 to 3000 micrometers. Preferably the carbon powder has a weight average particle size of 20 microns or greater. In certain embodiments of the invention, the activated carbon powder may have a surface area of at least 500 m$^2$/g. Commercial suppliers of activated carbon powder are numerous, and include, for example: Calgon Carbon Corp., Pittsburgh, Pa.; MeadWestvaco Corp., Glen Allen, Va.; and Kuraray Co., Ltd., Okayama, Japan. Blends and mixtures of different activated carbon powders can also be used. In such cases, each may have a different particle size distribution and/or other varying characteristics such as different surface areas.

Catalytic activated carbons are typically produced by charring processes similar to those for making activated carbons, but including a nitrogen-containing material (for example, ammonia, urea, etc.) at some point in the process. The resultant catalytic activated carbon effectively catalytically decomposes chloramine in the water. Catalytic activated carbon can be prepared, for example, according to the procedure described in U.S. Pat. No. 6,342,129 (Vaughn et al.) and U.S. Pat. No. 5,338,458 (Carrubba). Catalytic activated carbon (bituminous-based) believed to be made in this way is commercially available from Calgon Carbon Corp. under the trade designation "Centaur". Catalytic activated carbon can also be prepared, for example, by the method disclosed in U.S. Pat. No. 6,706,194 B2 (Baker et al.), which refers in turn to U.S. Pat. No. 4,624,937 (Chou)). In this method, a nitrogen source such as ammonia is included with an oxidizing gas during the activation/oxidation step. Commercial sources of catalytic activated carbons of this type are believed to include, for example, catalytic activated carbon marketed by MeadWestvaco Corp. under the trade designation "Nuchar AquaGuard".

In the event that commercially available size distributions of the activated carbon particles are not of the desired size distribution, comminution and/or classification of the activated carbon particles (for example, granules or powder) may be carried out, for example, using well-known techniques such as crushing and/or milling, and/or air classifying and/or sieving.

In addition to the activated carbon powder, the mixture may contain from 0.01 to 30 weight percent, preferably from 1.0 to 20 weight percent, based on the weight of the activated carbon, of one or more additional types of interactive particles. In one embodiment, however, the mixture does not contain any type of interactive particle other than activated carbon.

The interactive particles include particles or fibers which have a physical, electrical, or chemical interaction when they come into proximity or contact with dissolved or suspended materials in a fluid (liquid or gas) composition. Depending on the type of activity of the interactive particles, the particles may separate dissolved or suspended materials by chemical reaction, physical entrapment, physical attachment, electrical (charge or ionic) attraction, or similar means. Examples of interactions anticipated by the invention include, but are not limited to: physical entrapment of compounds from the fluid, such as nano clays, or zeolite particles; ion exchange resins; catalysts; electromagnetic particles; acid or basic particles for neutralization; etc.

Examples of additional interactive particles or fibers include, but are not limited to: metallic particles of 410, 304, and 316 stainless steel, copper, aluminum and nickel powders, ferromagnetic materials, activated alumina, carbon nanotubes, silica gel, acrylic powders and fibers, cellulose fibers, glass beads, various abrasives, common minerals such as silica, wood chips, ion-exchange resins, ceramics, zeolites, diatomaceous earth, polyester particles and fibers, and particles of engineering resins such as polycarbonate.

The interactive particle of the invention generally applicable are in the size range of 0.1 to 3,000 micrometers in diameter and fibers of 0.1 to 250 micrometers in diameter of essentially unlimited length to width ratio. Fibers are preferably chopped to no more than 5 mm in length. Fibers or powders should have sufficient thermal conductivity to allow heating of the powder mixtures. In addition, in an extrusion process, the particles and fibers must have melting points sufficiently above the melting point of the fluoropolymer binder resin to prevent both substances from melting and producing a continuous melted phase rather than the usually desired multi phase system.

Sufficient poly(vinylidene fluoride) binder is used, relative to the amount of activated carbon powder, that the particles of activated carbon in the composite porous solid article exhibit interconnectivity. The ratio of poly(vinylidene fluoride) binder to activated carbon may be from 0.5-35 weight percent of poly(vinylidene fluoride) to 65 to 99.5 weight percent activated carbon (the total equaling 100%), preferably from 0.5-15 weight percent of poly(vinylidene fluoride) binder to 85 to 99.5 weight percent activated carbon, more preferably from 1-10 weight percent of poly(vinylidene fluoride) to 90 to 99 weight percent activated carbon, and in one embodiment from 0.5-8, weight percent of poly(vinylidene fluoride) to 92 to 99.5 weight percent activated carbon. If less poly(vinylidene fluoride) is used, complete interconnectivity may not be achieved, and if more poly(vinylidene fluoride) is used, there may be a reduction in contact between the activated carbon particles and a fluid passing through the composite porous solid article.

Composite porous solid articles produced in accordance with the present invention may contain a relatively low proportion of binder relative to activated carbon, for example, only 3 to 14% binder (by weight), 12% or less binder (by weight), 10% or less binder (by weight), or 5 to 8% binder (by weight) in various embodiments, wherein the balance is activated carbon and other components, if such other components are present.

Methods for Forming Composite Porous Solid Articles

The production system of the present invention may utilize any of the methods and techniques known in the art to be suitable for the preparation of solid composite porous articles (e.g., porous separation articles, block products) from mixtures of thermoplastic resins (e.g., thermoplastic resin binder powders) and interactive powdery materials (e.g., activated carbon powders). Such methods can include, for example, extrusion methods as well as compression molding processes.

Mixtures of poly(vinylidene fluoride) binder powder and activated carbon powder are utilized in the production system of the present invention. Such mixtures may be prepared by any suitable procedure known in the art, including processes which involve combining at least one type of thermoplastic "binder" particle comprised of microfine particulate material (which in the present invention is comprised of poly(vinylidene fluoride) resin), with one or more types of interactive particles or fibers (which in the present invention is comprised of activated carbon in fine particulate form). To this mixture can be added a variety of additives and processing aids, if so desired (in certain embodiments of the invention, however, the mixture consists essentially of or consists of poly(vinylidene fluoride) resin and activated carbon). "Additives" are defined as materials that produce desirable changes in the properties of the final product, such as plasticizers that produce a more elastic or rubbery consistency, or stiffeners that produce a strong, brittle, and more ceramic-like final product. "Processing aids" are defined as materials that allow the mixture to be processed with greater ease, such as lubricants for molding. The binder may constitute about 3 to about 30% by weight of the overall mixture and, in one embodiment, about 4 to about 8%.

The mixing process typically used to mix binder and activated carbon is designed to produce as uniform a final product as possible. The quality of the mixture produced by the mixing equipment is important in the process. If the mixing involves the use of a cold mixing process, substantial levels of shear may be required to produce a stable, intimate mixture that is capable of being converted to a strong composite during final processing. For example, ball milling may be carried out in a modified ball mill equipped with articles to increase shear. Plow mixers may be modified with articles that "smear" the materials.

In one embodiment, a mixing process is used to attain a special distribution of particles within the mixture, wherein binder particles are dispersed individually or as small clusters between and upon the surrounding activated carbon particles. The binder particles may stick to the activated carbon particles in an effect that produces a low-dusting, slow moving matrix. To supplement this stickiness, the binder and/or activated carbon particles may benefit from being coated with a trace of surfactant or similar material. One method to produce this intimate blend of the carbon particles and PVDF binder involves dispersing the activated carbon in a PVDF latex and spray drying the mixture.

The resulting mixture, once all particles and components have been substantially uniformly dispersed, is then processed in accordance with the invention by a procedure which may include any of a number of conventional processes often applied to plastics. These include extruding to produce objects with two dimensional uniform shapes, hot roll compacting to produce thin sheets or thick slabs of material, or compression or injection molding to produce sheets or complex bulk shapes.

In one embodiment, a desired quantity of poly(vinylidene fluoride) binder powder is weighed out in a suitable ratio to active carbon powder and mixed using a high speed mixer, such as a Henschel mixer or a Waring bench top blender mill. Mixing speed can range from 800-1500 rpm. Mix time may range from 1 to 3 minutes, depending upon the amount of powder being blended.

In another embodiment, an intimate blend of the fluoropolymer and activated carbon is prepared by co-spray drying the components. One could mix together an effective amount of a PVDF latex with the powdery activated carbon and co-spray them to achieve a dry powder that is well mixed at nano-scale. This co-spray dried complex can then be used as the mixture which is molded to any desired shape and porosity. A small particle size latex (generally 20-400 nm) provides an extremely intimate blend with the activated carbon particles, and can reduce the level of binder required, while making the highest amount of activated carbon surface available for separation. The cospray dried complex involves these very small emulsion particles, physically associated with the activated carbon particles through the spray drying of the blend.

In another embodiment, an intimate blend of PVDF fluoropolymer binder and activated carbon are mixed using a low shear ribbon blender.

Forming Methods

Any of the extrusion, compression molding and other processes for the formation of solid composite porous articles known in the art may be adapted for use in the production system of the present invention, including those can be found in patent documents such as U.S. Pat. Nos. 5,019,311; 5,147,722; 5,331,037; WO 2014/055473; and WO 2014/182861, each of which is incorporated herein by reference in its entirety for all purposes.

An extrusion process for the formation of a block article can be found in patents by E. Koslow, such as U.S. Pat. No. 5,331,037, incorporated herein by reference. The process involves combining at least one fluoropolymer "binder" particle, consisting of microfine particulate material, mixed with one or more types of interactive particles or fibers. The interactive particles and fibers can consist of nearly any granular, powders, or microfine material or a range of fine or coarse fibers. The particles and fibers should have melting or softening points significantly higher than those of the fluoropolymer binder particles. To this mixture can be added a variety of additives and processing aids. "Additives" are defined as materials that produce desirable changes in the properties of the final product, such as plasticizers that produce a more elastic or rubbery consistency, or stiffeners that produce a strong, brittle, and more ceramic-like final product. "Processing aids" are defined as materials that allow the mixture to be processed with greater ease, such as lubricants for injection molding. The binder should constitute about 3 to about 30% by weight of the overall mixture and, preferably, about 4 to about 8%.

To accomplish the formation of a continuous web of the poly(vinylidene fluoride) binder and the immobilization or forced point-bonding of the activated carbon powder, the plastics molding, extruding, roll compacting, or other forming equipment is operated in such a manner as to obtain a critical combination of applied pressure, temperature, and shear in a required time sequence. The conditions required to convert the poly(vinylidene fluoride) binder particles from their original, normally powder or spherical particulate form, into a thin, continuous web matrix within the final structure varies according to the particular type of resin used. However, the basic procedure may include the following steps in one embodiment of the present invention:

1. In the absence of any significant pressure or shear, the mixture is first brought to a temperature sufficiently above (preferably at least about 20° C., most preferably about 40° C. above) the softening point of the binder, but normally below the softening point of the activated carbon within the mixture.
2. After being heated to at least the temperature of step 1, the mixture is placed under sufficient applied pressure, generally at least about 50 psi (3.5 kg/cm$^2$), preferably at least about 1000 psi (70.31 kg/cm$^2$) and most preferably at least about 6,000 psi (421.86 kg/cm$^2$) to substantially immediately consolidate the loose material and work the binder resin by the surrounding activated carbon particles to convert at least a portion of said binder material particles into a continuous web between the activated carbon particles. The applied pressure must be sufficient to "activate" or soften the binder and is applied only upon reaching the necessary temperature as mentioned in step 1.
3. The mixture must undergo at least some minimal (finite) shear during the application of pressure, even if the shear is simply the movement of the particles required to consolidate the mass from its originally loose form into a more compact form. It is believed that this serves to "smear" the particles of binder into thin films which coalesce with one another to form a continuous web matrix. During extrusion, although the particles would be preconsolidated during heating in the die, the material experiences a combination of shear and pressure in the final forming portion of the die where temperature, pressure drop, and shear are sufficient to accomplish the conversion of the binder.
4. The application of heat and pressure must be of sufficiently short duration that the continuous web formed during the process does not revert to a non-continuous condition as a result of melting and reconsolidation into individual droplets or particles.
5. The process is conducted at great speed and then the resulting immobilized material is relatively quickly cooled to a temperature below the melting point of the binder to "freeze" the unstable structure once it is formed.

In another embodiment of this invention, the applied pressure in step 2 is in the lower range such that the formation of a continuous web decreases or ceases and the composite structure is formed by forced point-bonding between the activated carbon particles. The application of heat and pressure in this process is also of short duration and the cooling is relatively quick so that the forced point-bonds formed during the process are retained.

Pulling, cutting, or applying a stress to the structure converts the fine web of poly(vinylidene fluoride) binder into very fine fibers. The resulting fibers can sometimes be very fine and fibrillated into even submicron sizes.

The speed of the process appears to be limited primarily by the speed with which heat can be transferred into the mixture of particles. The formation of the continuous polymeric web or forced point-bonds appears to require only a momentary application of high pressure and shear. If the product is held for an extended period at the elevated temperature, there may be a rapid deterioration of the product and loss of the continuous web or binding points. Therefore, following the formation of continuous binder resin structure in the material, the material desirably should be cooled rapidly, preferably as rapidly as possible. Prior to the complete cooling of the product, the structure remains soft and can be deformed easily. The product is therefore usually allowed to partially cool somewhat prior to removal from the mold or emergence from the extrusion tool. In this warm condition, the product may be manipulated to produce a fine surface finish or a smoothed sheet. Water sprays or air blasts may be used to hasten cooling. Flat sheets produced on a hot roll compactor are allowed to cool during their travel several feet from the roll prior to being manipulated. In some cases, sheets of the material are further processed for flatness while still warm and pliable.

The product of the process can be a rubbery or plastic material whose properties can be varied widely through the use of higher or lower pressure and shear, higher or lower temperature, and through the use of various additives that, in small amounts, substantially change the properties of the product.

It has been observed that increasing the pressure and applied shear upon the mixture will result in a substantial increase in the degree of continuity of the poly(vinylidene fluoride) binder resin within the product structure. The thickness of the web produced by an applied stress appears to decline as temperature is increased from a minimum temperature to a maximum temperature. Above a certain temperature, the resulting matrix formation is observed to decline. It is suspected that, above a critical temperature, the continuous structure formed by the process cannot cool quickly enough below a "melt flow" temperature and the continuous web is lost due to subsequent flow back into globular form.

The process is therefore usually carried out within a preferred operational temperature range. This range may vary with the size and shape of the object being produced. For example, thin sheets that can be heated and cooled very quickly can be formed at lower temperatures than larger slabs or bulk shapes. The allowed temperature range therefore becomes more limited as the size of the object being formed increases. In practice, objects up to 2 inches (5.1 cm) in thickness can be formed within a practical temperature range. However, the ability to carry out the process declines with increasing thickness of the product as the required temperature rises and the ability to cool quickly is lost.

It has been found that a minimum applied pressure and significant shear are required to "activate" the process. Below a critical pressure, no continuous binder structure is observed to occur. Forced point-bonding of the activated carbon particles can, however, still occur.

In a compression molding process, the mixture of poly (vinylidene fluoride) binder powder and activated carbon powder may be loaded into a compression molding frame so that the powder completely and evenly fills the mold frame to the top surface. The frame may be pre-set on a larger area steel plate with piece of polyimide film covering the plate area underneath the mold frame. A slight excess of the mixture on the top surface helps the compression process. Impulse filling and vibration filling techniques may be employed. The top of the mold frame may be covered with another piece of polyimide film, and then a solid steel plate placed on top.

The loaded mold assembly may then be placed on the heated platens of a press, and compressed until the upper and lower platens contact the mold assembly to a desired initial pressure (e.g., 1000-3000 psi). The platens may, for example, be at a temperature of 430° F. to 470° F. This is the pre-heat step, and the mold may be allowed to heat for 3-5 minutes, for example, under these conditions. The compaction pressure is then increased (for example, to 8000 to 12,000 psi) and the mold held at temperature for an additional 3-5 minutes. The pressure is then released and the hot mold immediately transferred to a cold press where it is re-compressed (to 8000 to 12,000 psi, for example) for 1 to 5 minutes to cool. The mold is then released from the press and taken apart to isolate the solidified molded plaque (i.e., the composite porous solid article).

Production System

Regardless of the particulars of the processing method selected for use in forming the composite porous solid articles, the production system of the present invention is characterized by the inclusion of at least one step wherein an individual article that has been produced is inspected to confirm whether it is completely black in color. As previously mentioned, when the mixture of poly(vinylidene fluoride) binder powder and activated carbon powder is fully cured, it appears black. If full cure has not been achieved in some region of the composite porous solid article, such region will be blue in color. The manner in which such inspection may be most effectively and conveniently carried out will depend upon the particular forming procedure being used as well as the geometry and other characteristics of the article being produced. Generally speaking, it will be advantageous to examine a representative cross-section (or multiple representative cross-sections) of the article in order to confirm whether complete curing of the mixture within the interior of the article has been attained. This is because typically heat is being transferred into the mixture during the forming step(s) by a heated surface in contact with the mixture. Regions of the mixture in proximity to the heated surface will attain a given temperature more quickly than regions further away from the heated surface. As complete cure of the mixture is dependent, at least in part, upon the mixture reaching a minimum temperature effective to soften the poly(vinylidene fluoride) binder powder sufficiently that it forms a web matrix which immobilizes or force point-bonds the activated carbon powder, this means that an interior region or regions may not be fully cured under processing conditions effective to fully cure the region(s) nearer to the heated surface.

For example, where the article is being formed by extrusion through a die and the extruded article has an interior cavity (as in a tube, for example), the region of the article proximate to the interior cavity may be incompletely cured. This may be readily determined by visual inspection of an end of the article, if the article is produced by cutting the extrudate into lengths after exiting the extruder. As another example, where the article is in the form of a sheet produced by a compression molding process, an interior region of the sheet may remain incompletely cured since it is relatively remote from the heated surfaces of the mold. All of the exterior surfaces of the article may be black in color, indicating complete cure of those surfaces, thus masking whether the sheet has been fully cured throughout its entire thickness. An article thus produced may be cross-sectioned (by cutting or slicing, for example) to permit inspection of the interior region as well. Such inspection may be carried out through simple visual inspection by a human operator. Alternatively, inspection of the article could be done using instrumentation, wherein the color is assessed using a spectrophotometer or the like.

If inspection of an article produced using a given set of processing conditions establishes that full cure of the mixture comprising the article has been achieved (as confirmed by the article being completely black in color), then additional articles may be continued to be produced using the same set of processing conditions. On-going sampling and inspection of the articles being produced may be continued to provide assurance that such conditions are remaining effective to provide the desired full curing of the articles.

If, on the other hand, such inspection reveals that one or more regions of the article are blue in color (an indicator of incomplete cure) then the processing conditions used to produce that article are changed and one or more additional articles are produced using the new set of processing conditions and similarly inspected to confirm whether or not full cure of the mixture is being achieved under the new processing conditions. For example, the new set of processing conditions may include a processing temperature which is higher than the processing temperature at which the article found to be incompletely cured was produced. For example, if the original processing temperature was X° C., then the new processing temperature may be X+1° C.; X+2° C.; X+3° C.; X+4° C.; X+5° C.; X+6° C.; X+7° C.; X+8° C.; X+9° C.; X+10° C.; or an even greater incremental increase. If the incremental increase in processing temperature is found to still be insufficient to provide an article that is fully cured (as evidenced by being completely black), then one or more further incremental increases in processing temperature may be made until full cure of the articles being produced is observed. For example, where articles are being made by a compression molding process, the mold temperature may be increased in the manner just described. Where the articles are being produced by extrusion, the extruder and/or die temperatures may be increased.

Other processing parameters which may be adjusted in order to achieve full curing of the article include the heating time as well as the compaction (compression) pressure applied during forming. For example, if an extrusion process is being utilized, the time at which the mixture remains in a hot extrusion system may be increased and/or the pressure being applied to such mixture while in the extruder and forming die may be increased. In a compression molding process, the residence time in the mold may be increased.

EXAMPLES

Example 1

Figure 2:
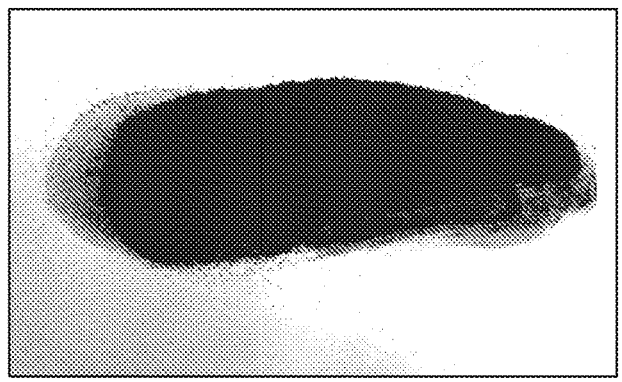
FIG. 2: shows activated carbon (black).
Figure 3:
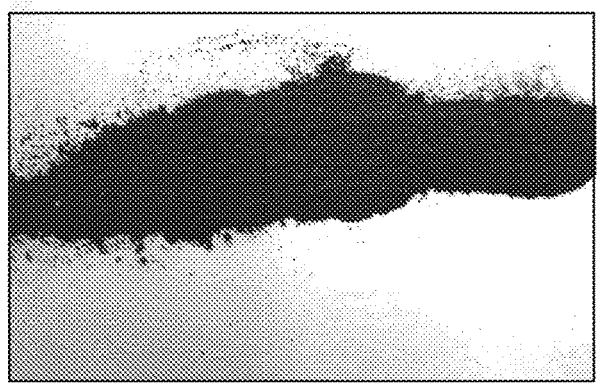
FIG. 3: shows a physical blend of Kyblock® PVDF powder, and activated carbon, the blend being blue.

Kyblock® PVDF powder—white (from Arkema Inc.) (shown in FIG. 1), was physically blended with activated carbon—black (shown in FIG. 2), The physical blend, shown in FIG. 3 has a blue color.

Example 2

A mixture of 14 weight percent Kyblock® RC-10,281 (Arkema) and 86 weight percent activated carbon was extruded to form composite porous solid articles in the form of tubes. The Kyblock® RC-10,281 has a particle size range of 3-6 microns and a melt viscosity of 17.5-22.5 kpoise at 232° C. per ASTM D 3835 and has been designed specifically for the continuous extrusion process. The activated carbon is a 80×325 coconut shell carbon. The formulation powder is processed through the extruder at temperature set points of 375° F. After extrusion, cross-sections of the pipes were examined for uniform color. It was discovered that an interface appeared between the black outside diameter of the tube, which had fully fused, and the uncured fairly bright blue inside diameter of the heterogeneous tube.

Figure 4:
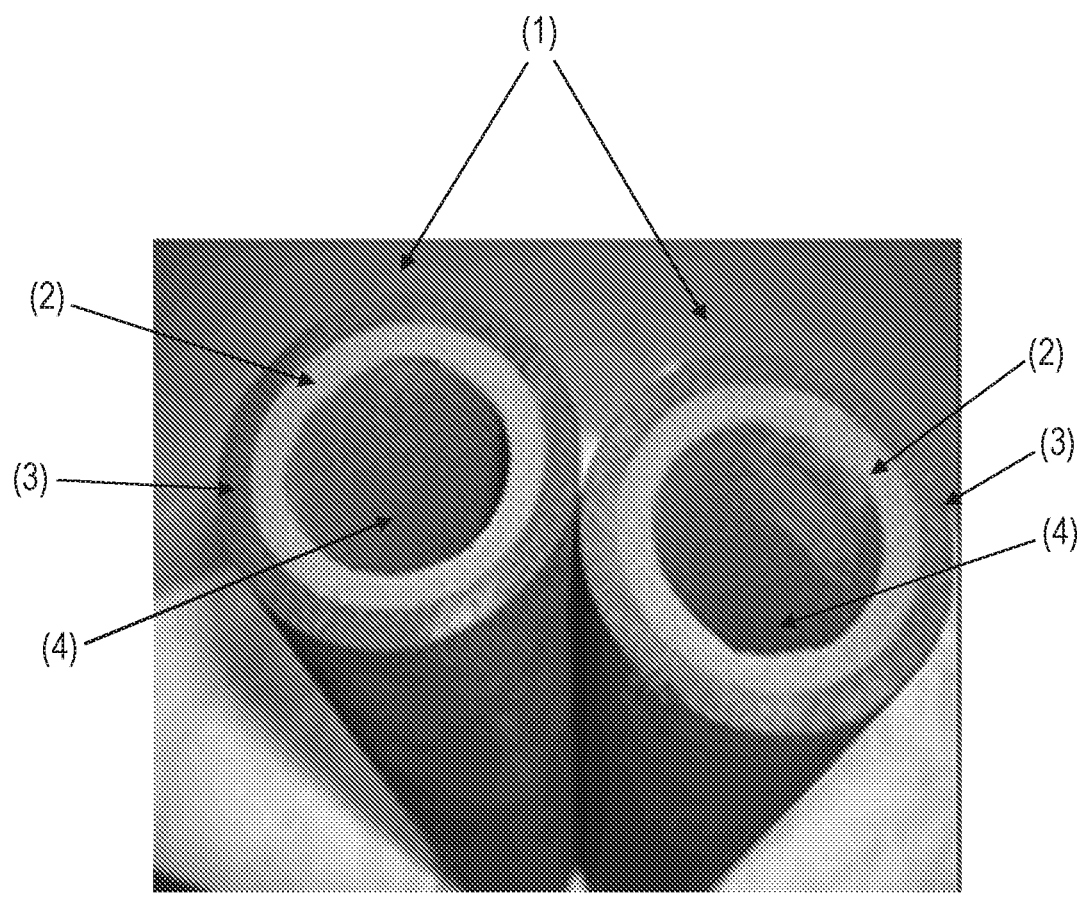
FIG. 4 shows exemplary composite porous solid articles, in the form of tubes, that have not been fully cured. Two partially cured carbon blocks utilizing Kyblock® binder technology.
 (1) Uncured region of blocks with blue color, indicating that the binder has not cured and permanently bound the formulation together.
 (2) Cured region of blocks with black color, indicating that the binder has not cured and permanently bound the formulation together.
 (3) Inside surface area uncured blue region of a carbon block containing Kyblock® technology

FIG. 4 shows a cross-sectional view of the tubes (1) produced under condition 1 at 375° F. Under the aforementioned processing conditions, the articles were not fully cured. In particular, region (2) of the tube wall proximate to the interior cavity (4) of the tube was visibly blue in color (indicating incomplete curing of this region). This interior region (2) is located opposite of the direct heat from heater bands. In contrast, region (3) of the tube wall proximate to the exterior of the tube was black in color (indicating that this region, which is in closer proximity to direct heat from a heater band, had been fully cured).

Regions (2) and (3) have the following Hunter color values:
Region (3) (black): L=17.05 a=0.29 b=0.06
Region (2) (blue): L=30.14 a=−0.80 b=−7.66

The same formulation as described above (a mixture of 14 weight percent Kyblock® RC-10,281 and 86 weight percent activated carbon) was extruded under the same conditions, except that the process temperature was increased from 375° F. to 440° F. These conditions resulted in a fully cured, homogeneously black carbon block structure having sufficient mechanical integrity and resistance to friability of the activated carbon. The tubes produced did not exhibit any blue color when viewed in cross-section, unlike the tubes produced at the lower process temperature. That is, interior region (2) and exterior region (3) were both black in color (indicative of full curing).

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A production system for making composite porous solid articles, wherein the production system comprises the steps of:
   a) heating and optionally compressing a first portion of a mixture of a poly(vinylidene fluoride) binder powder and activated carbon powder under a first set of processing conditions to form a first composite porous solid article;
   b) inspecting the first composite porous solid article to determine if the first composite porous solid article is completely black in color; and
   c-1) if the first composite porous solid article is completely black in color, heating and compressing a second portion of the mixture under the first set of processing conditions to form a second composite porous solid article; or
   c-2) if the first composite porous solid article is not completely black in color, selecting a second set of processing conditions different from the first set of processing conditions and heating and forming a second portion of the mixture under the second set of processing conditions to form a second composite porous solid article.
2. The production system of aspect 1, wherein the heating and compressing of the first portion and the second portion of the mixture is performed by compression molding the mixture.
3. The production system of aspect 1, wherein the heating of the formulation is performed without added compression.
4. The production system of aspects 1 or 2, wherein the heating and compressing of the first portion and the second portion of the mixture is performed by extruding the mixture.
5. The production system of any of aspects 1-4, wherein step c-2) is performed and the second set of processing conditions differs from the first set of processing conditions in that heating and optional compressing the second portion of the mixture is performed at a higher temperature.
6. The production system of any of aspects 1-5, wherein the first composite porous solid article and the second composite porous solid article are each in the form of a solid or hollow cylinder.
7. The production system of any of aspects 1-6, wherein the first composite porous solid article and the second composite porous solid article are each in the form of a sheet.
8. The production system of any of aspects 1-7, wherein the poly(vinylidene fluoride) binder powder has an average particle size of less than 20 micrometers.
9. The production system of any of aspects 1-8, wherein the poly(vinylidene fluoride) binder comprises between about 3 and about 30 percent by weight of the first composite porous solid article and the second composite porous solid article.
10. The production system of any of aspects 1-9, wherein the mixture of PVDF powder and activated carbon further comprises active functional particles.
11. The production system of any of aspects 1-10, wherein the activated carbon powder has an average particle size of 20 micrometers and greater.
12. The production system of any of aspects 1-11, wherein step c-2) is performed and wherein the production system comprises additional steps of inspecting the second composite porous solid article to determine if the second composite porous solid article is completely black in color and, if the second composite porous solid article is completely black in color, heating and compressing a third portion of the mixture under the second set of processing conditions to form a third composite porous solid article, or, if the second composite porous solid article is not completely black in color, selecting a third set of processing conditions different from the first set and second set of processing conditions and heating and forming a third portion of the mixture under the third set of processing conditions to form a third composite porous solid article.

13. The production system of any of aspects 1-12, wherein the first composite porous article exhibits at least one region which is blue in color.
14. The production system of any of aspects 1-13, wherein the mixture of the poly(vinylidene fluoride) binder powder and activated carbon powder is blue in color prior to being exposed to heat and compression.
15. A set of composite porous solid articles, comprising a first composite porous solid article and a second composite porous solid article, wherein the first composite porous solid article and the second composite porous solid article are compositionally the same and are comprised of a poly(vinylidene fluoride) binder and activated carbon, the first composite solid article contains at least one region which is blue in color and is an unfinished article, and the second composite solid article is completely black in color and is a finished article.
16. The set of aspect 15, wherein the poly(vinylidene fluoride) binder comprises between about 3 and about 30 percent by weight of the first composite porous solid article and the second composite porous solid article.
17. The set of aspects 15 or 16, wherein the ratio of poly(vinylidene fluoride) binder to activated carbon is from 0.5 to 35 weight percent of poly(vinylidene fluoride) binder to 65 to 99.5 weight percent of activated carbon, the total equaling 100%.
18. The set of any of aspects 15-17, wherein the poly (vinylidene fluoride) binder has a melt viscosity of between 4 and 55 kpoise, as measured by ASTM D3835 at 232° C. and 100 s$^{-1}$.
19. The set of any of aspects 15-18, wherein a poly (vinylidene fluoride) binder powder is used to prepare the first composite porous solid article and the second composite porous solid article and the poly(vinylidene fluoride) binder powder has a particle size of from 3 to 20 microns.
20. The set of any of aspects 15-19, wherein the activated carbon has a particle size of from 0.1 to 3000 micrometers.

What is claimed is:

1. A production system for making composite porous solid articles, wherein the production system comprises the steps of:
    a) heating and optionally compressing a first portion of a mixture of a poly(vinylidene fluoride) binder powder and activated carbon powder under a first set of processing conditions to form a first composite porous solid article;
    b) inspecting the first composite porous solid article to determine if the first composite porous solid article is completely black in color; and
    c-1) if the first composite porous solid article is completely black in color, heating and compressing a second portion of the mixture under the first set of processing conditions to form a second composite porous solid article; or
    c-2) if the first composite porous solid article is not completely black in color, selecting a second set of processing conditions different from the first set of processing conditions and heating and forming a second portion of the mixture under the second set of processing conditions to form a second composite porous solid article.

2. The production system of claim 1, wherein the heating and compressing of the first portion and the second portion of the mixture is performed by compression molding the mixture.
3. The production system of claim 1, wherein the heating of the formulation is performed without added compression.
4. The production system of claim 1, wherein the heating and compressing of the first portion and the second portion of the mixture is performed by extruding the mixture.
5. The production system of claim 1, wherein step c-2) is performed and the second set of processing conditions differs from the first set of processing conditions in that heating and compressing the second portion of the mixture is performed at a higher temperature.
6. The production system of claim 1, wherein the first composite porous solid article and the second composite porous solid article are each in the form of a solid or hollow cylinder.
7. The production system of claim 1, wherein the first composite porous solid article and the second composite porous solid article are each in the form of a sheet.
8. The production system of claim 1, wherein the poly (vinylidene fluoride) binder powder has an average particle size of less than 20 micrometers.
9. The production system of claim 1, wherein the poly (vinylidene fluoride) binder comprises between about 3 and about 30 percent by weight of the first composite porous solid article and the second composite porous solid article.
10. The production system of claim 1, wherein the mixture of PVDF powder and activated carbon further comprises active functional particles.
11. The production system of claim 1, wherein the activated carbon powder has an average particle size of 20 micrometers and greater.
12. The production system of claim 1, wherein step c-2) is performed and wherein the production system comprises additional steps of inspecting the second composite porous solid article to determine if the second composite porous solid article is completely black in color and, if the second composite porous solid article is completely black in color, heating and compressing a third portion of the mixture under the second set of processing conditions to form a third composite porous solid article, or, if the second composite porous solid article is not completely black in color, selecting a third set of processing conditions different from the first set and second set of processing conditions and heating and forming a third portion of the mixture under the third set of processing conditions to form a third composite porous solid article.
13. The production system of claim 1, wherein the first composite porous article exhibits at least one region which is blue in color.
14. The production system of claim 1, wherein the mixture of the poly(vinylidene fluoride) binder powder and activated carbon powder is blue in color prior to being exposed to heat and compression.

* * * * *